United States Patent [19]

Muramatsu et al.

[11] Patent Number: 4,518,742

[45] Date of Patent: May 21, 1985

[54] THERMOPLASTIC RESIN COMPOSITION HAVING TOUGHNESS AND HIGH HEAT DISTORTION RESISTANCE

[75] Inventors: Eiichi Muramatsu, Himeji; Shigemi Matsumoto, Takasago; Fumiya Nagoshi, Kobe, all of Japan

[73] Assignee: Kanegafuchi Kagaku Kogyo Kabushiki Kaisha, Osaka, Japan

[21] Appl. No.: 546,596

[22] Filed: Oct. 28, 1983

[30] Foreign Application Priority Data

Nov. 1, 1982 [JP] Japan .................................. 57-192198

[51] Int. Cl.$^3$ ........................ C08L 69/00; C08L 51/00
[52] U.S. Cl. ........................................ 525/67; 525/316
[58] Field of Search ................. 525/67, 316, 146, 468

[56] References Cited

FOREIGN PATENT DOCUMENTS 0051336  5/1982  European Pat. Off. .

Primary Examiner—Theodore E. Pertilla
Attorney, Agent, or Firm—Antonelli, Terry & Wands

[57] ABSTRACT

A thermoplastic resin composition having excellent impact resistance, heat distortion resistance and processability which comprises an aromatic polycarbonate and a thermoplastic resin prepared by polymerizing a monomer mixture containing mainly acrylonitrile and styrene in the presence of a diene rubber, adding α-methylstyrene or a monomer mixture containing mainly α-methylstyrene to the system, and continuing the polymerization, while gradually adding acrylonitrile or a monomer mixture containing mainly acrylonitrile.

3 Claims, No Drawings

THERMOPLASTIC RESIN COMPOSITION HAVING TOUGHNESS AND HIGH HEAT DISTORTION RESISTANCE

BACKGROUND OF THE INVENTION

The present invention relates to a thermoplastic resin composition having excellent heat distortion resistance, impact resistance and thermal discoloration, resistance, and more particularly to a composition containing (I) a resin obtained by polymerizing a monomer mixture having a high content of α-methylstyrene in the presence of a diene rubber in a specific manner and (II) an aromatic polycarbonate.

An acrylonitrile/butadine/styrene copolymer (ABS resin) is an inexpensive material having excellent mechanical property and processability, but the use thereof for members requiring heat resistance and higher impact resistance is restricted. On the other hand, an aromatic polycarbonate has been employed as a material which is tough because of having a high impact strength and moreover is excellent in heat distortion resistance. However, the polycarbonate has the defects that thick moldings made thereof are brittle due to poor processability and also it is expensive. For offsetting these defects, it is proposed to blend a polycarbonate with other resins, e.g. a blend of a polycarbonate and ABS resin (Japanese Examined Patent Publication No. 15225/1963), a blend of a polycarbonate and a styrene/methacrylate or styrene/methyl methacylate/acrylonitrile copolymer grafted on a styrene/butadine copolymer (Japanese Examined Patent Publication No. 71/1964) and a blend of a polycarbonate and a thermoplastic vinyl resin containing a linear vinyl polymer made of α-methylstyrene as a main component (Japanese Unexamined Patent Publication No. 504/1977). However, these known compositions are ones proposed with the objects of improving only the processability of polycarbonate, and accordingly they cannot exhibit both of an excellent heat distortion resistance and a high impact strength over a wide range of the blending ratio. That is to say, in case that a composition having an impact resistance and a heat distortion resistance both maintained on a high level is required, the proportion of the polycarbonate must be raised, and accordingly, in such a case, these compositions have the disadvantages of increase in cost and lowering in moldability. Also, when the content of α-methylstyrene in a thermoplastic resin to be blended with polycarbonate is increased for the purpose of raising the heat resistance in a low blending ratio region of polycarbonate, the impact resistance of the blend is lowered and also the polymerization conversion in the preparation of the thermoplastic resin is lowered. On the other hand, when a rubber component in the thermoplastic resin is increased for raising the impact resistance, the heat resistance of the blend is lowered.

It is an object of the present invention to provide a thermoplastic resin composition having excellent heat distortion resistance, impact resistance and processability and being inexpensive.

The above and other objects of the present invention will become apparent from the description hereinafter.

SUMMARY OF THE INVENTION

In accordance with the present invention, there is provided a composition comprising (I) a thermoplastic resin and (II) an aromatic polycarbonate in a (I)/(II) ratio of 90/10 to 40/60 by weight, said resin (I) being prepared by polymerizing 95 to 70 parts by weight of monomers in the presence of 5 to 30 parts by weight of a diene rubber by a process which comprises polymerizing 2 to 40 parts by weight of (A) a monomer mixture containing acrylonitrile and styrene in an acrylonitrile/styrene ratio of 10/90 to 40/60 by weight in the presence of the diene rubber, adding 50 to 90 parts by weight of (B) α-methylstyrene or a monomer mixture containing at least 80% by weight of α-methylstyrene to the polymerization system, and gradually adding (C) acrylonitrile or a monomer mixture containing at least 70% by weight of acrylonitrile to the system, while carrying out the polymerization, the ratio of the total weight of α-methylstyrene contained in the monomers (B) and (C) to the total weight of acrylonitrile contained in the monomers (B) and (C) being from 90/10 to 65/35.

DETAILED DESCRIPTION

The thermoplastic resin (I) used in the present invention is a product obtained by polymerizing α-methylstyrene, acrylonitrile and styrene with or without other vinyl monomers copolymerizable therewith in the presence of a diene rubber in a specific manner, and has high impact and heat distortion resistances and an excellent resistance to discoloration by heat at the time of heat molding or after molding.

Hitherto, there have been proposed various processes for polymerizing monomers composed mainly of α-methylstyrene, acrylonitrile and styrene in the presence of a diene rubber. However, the copolymers obtained by these known processes have the disadvantage that the impact resistance is insufficient when the content of α-methylstyrene is high, and the heat distortion resistance is insufficient when the content of α-methylstyrene is low. A process proposed to overcome the above disadvantage is disclosed in Japanese Examined Patent Publication No. 14936/1969, but the content of α-methylstyrene is less than 50% by weight and, therefore, a sufficient heat distortion resistance is not expected.

The present inventors have found that a thermoplastic resin having a high impact resistance, a high heat distortion resistance and a good thermal discoloration resistance is prepared with an industrial advantage by carrying out a polymerization of a monomer mixture containing mainly acrylonitrile and styrene in the presence of a diene rubber, adding a monomer mixture containing mainly α-methylstyrene to the polymerization system, and continuing the polymerization, while gradually adding a monomer mixture containing mainly acrylonitrile to the polymerization system in a continuous or intermittent addition manner. A blend of (I) the so prepared thermoplastic resin with (II) an aromatic polycarbonate has a high impact resistance and a high heat resistance as compared with known analogous blends. When the polycarbonate content in a blend of a thermoplastic resin and an aromatic polycarbonate is relatively low, the blend is in the state of a phase structure consisting of a continuous phase of the thermoplastic resin and a dispersed phase of the polycarbonate. Since it has been considered that the continuous phase has a large influence on the impact resistance and heat resistance of the blend, it is very important that the thermoplastic resin itself has excellent impact resistance and heat resistance. The thermoplastic resin (I) of the present invention has excellent impact resistance and heat resistance, and accordingly it is possible to blend it with the polycarbonate (II) in a wide range of the blending ratio.

In the preparation of the thermoplastic resin (I) used in the present invention, 95 to 70 parts by weight in total of acrylonitrile, styrene, α-methylstyrene, and other monomers copolymerizable therewith used as occasion demands are polymerized in the presence of 5 to 30 parts by weight of a synthetic diene rubber. The monomers to be polymerized in the presence of the diene rubber are added to the polymerization system in a specific manner. That is to say, (A) a monomer mixture containing acrylonitrile and styrene as main components, (B) α-methylstyrene or a monomer mixture containing α-methylstyrene as a main component and (C) acrylonitrile or a monomer mixture containing acrylonitrile as a main component are added to the polymerization system in the order of (A), (B) and (C). The manner of adding the monomers (A), (B) and (C) is not particularly limited. Preferably, the monomer or monomers (B) are added to the system after most of the monomer mixture (A) are polymerized, and subsequently the monomer or monomers (C) are added to the system little by little. Although the monomer or monomers (C) may be added to the system continuously or intermittently, it is preferable that during the period till the polymerization conversion of α-methylstyrene reaches 40%, the monomer or monomers (C) are added so that the ratio of α-methylstyrene to acrylonitrile present in the system becomes not less than 90/10 by weight, especially not less than 95/5 by weight. Usually, the monomer or monomers (C) are added to the polymerization system over at least 4 hours, especially at least 5 hours.

The amount of the diene rubber and the amounts and compositions of the monomers (A), (B) and (C) are suitably selected according to the physical properties of the thermoplastic resin (I) or the blend thereof with the polycarbonate (II).

Preferably, the amount of the synthetic diene rubber is selected from 5 to 30 parts by weight per 100 parts by weight of the total of the diene rubber and the monomers used. The use of the diene rubber outside the above range is not desirable from the viewpoint of impact resistance and heat distortion resistance. Examples of the diene rubber used in the present invention are, for instance, butadiene rubber, styrene-butadiene rubber, and isoprene rubber.

The monomer mixture (A) contains acrylonitrile and styrene as main components. The ratio of acrylonitrile to styrene is from 10/90 to 40/60 by weight. The monomer mixture (A) may contain at most 30% by weight of other vinyl monomers. Examples of the vinyl monomers are, for instance, α-methylstyrene, chlorostyrene, methyl methacrylate, methacrylonitrile. The amount of the monomer mixture (A) is selected from 2 to 40 parts by weight, preferably 2 to 20 parts by weight, based on 100 parts by weight of the total of the diene rubber and the whole monomers used. When the amount of the monomer mixture (A) is more than the above range, the heat distortion resistance is lowered, and when the amount is less than the above range, the impace resistance is lowered.

Alpha-methylstyrene or a mixture thereof with other vinyl monomers is secondarily added to the polymerization system as a monomer (B) in an amount of 50 to 90 parts by weight based on 100 parts by weight of the total of the diene rubber and the whole monomers used. When the amount of the monomer (B) is less than 50 parts by weight, the heat distortion resistance is lowered. The use of the monomer (B) in an amount of more than 90 parts by weight is not desirable from the viewpoint of the polymerization conversion and the impact resistance. It is preferable that the monomer mixture contains at least 80% by weight of α-methylstyrene. The use of other vinyl monomers in an amount of more than 20% by weight is not desirable from the viewpoint of the heat distortion resistance. Examples of the other vinyl monomers are, for instance, styrene, chlorostyrene, acrylonitrile, methacrylonitrile and methyl methacrylate.

Acrylonitrile or a mixture of at least 70% by weight of acrylonitrile with other vinyl monomers is gradually added to the system as a monomer (C) after the addition of the monomer (B) in such an amount that the ratio of α-methylstyrene included in the monomers (B) and (C) to acrylonitrile included in the monomers (B) and (C) falls within the range of 90/10 to 65/35 by weight. When the ratio is larger than 90/10 by weight, the polymerization conversion and the impact resistance are lowered, and when the ratio is smaller than 65/35 by weight, the thermal discoloration is remarkable. Examples of the other vinyl monomers are, for instance, α-methylstyrene, styrene, chlorostyrene, methyl methacrylate and methacrylonitrile.

The thermoplastic resin (I) is prepared preferably by an emulsion polymerization method, but the preparation is not limited to the emulsion polymerization. The emulsion polymerization can be carried out in a usual manner, and for instance, the above-mentioned monomers are polymerized in an aqueous medium in the presence of a diene rubber by means of a radical polymerization initiator, e.g. peroxides such as potassium persulfate, ammonium persulfate and cumene hydroperoxide. Polymerization accelerators, agents for controlling the degree of polymerization, emulsifiers and others which are generally used in emulsion polymerization can be used in the present invention. Examples of the emulsifiers are, for instance, carboxylic acid salts such as sodium laurate, sodium oleate and potassium palmitate, sulfates such as sodium lauryl sulfate, sulfonates such as sodium dodecylbenzene sulfonate, dialkylsulfosuccinates such as sodium dioctylsulfosuccinate, and the like.

The polymerization temperature is preferably selected from 40° to 80° C. The obtained latex is coagulated by employing a coagulating agent such as an acid or a metal salt. The coagulated polymer is then dehydrated and dried to give a powder. As a coagulating agent, there are for instance employed hydrochloric acid, aluminum sulfate, calcium chloride and magnesium sulfate, but in case of using a carboxylic acid salt as an emulsifier, it is desirable to avoid the use of a bivalent metal salt as a coagulating agent.

Preferably, the aromatic polycarbonate (II) used in the present invention are a polycarbonate derived from 2,2-bis(4-hydroxyphenyl)propane. The polycarbonate may be employed in combination with at least one member selected from the group consisting of a so-called modified polycarbonate, a copolycarbonate, a brominated polycarbonate and polycarbonate having a different molecular weight.

The blending ratio of the thermoplastic resin (I) to the aromatic polycarbonate (II) is selected from 90/10 to 40/60 by weight. When the content of the polycarbonate in the blend is less than 10% by weight, the impact resistance and heat distortion resistance of the composition are lowered, and when the content of the polycarbonate is more than 60% by weight, the moldability of the composition is lowered and moreover the cost is increased.

The composition of the invention obtained by blending the resins (I) and (II) may be granulated or molded into a desired shape such as pellet by employing a granulator, a pelletizer or the like. The blending, granulation and molding can be conducted by known methods. The composition of the present invention may contain additives such as a stabilizer, a pigment, a lubricant and a filler, as occasion demands.

The present invention is more specifically described and explained by means of the following Examples, in which all parts are by weight. It is to be understood that the present invention is not limited to the Examples, and various changes and modifications may be made in the invention without departing from the spirit and scope thereof.

EXAMPLES 1 to 5

Thermoplastic resins (I) were prepared as follows:

| Ingredients | Amount (part) |
|---|---|
| Water | 250 |
| Sodium dioctylsulfosuccinate | 2.5 |
| Formaldehyde sodium sulfoxylate | 0.4 |
| Disodium ethylenediaminetetraacetate | 0.01 |
| Ferrous sulfate | 0.0025 |

A reactor equipped with a stirrer was charged with water, disodium ethylenediaminetetraacetate and ferrous sulfate. After deoxidation, the temperature was elevated to 60° C. in a nitrogen stream with stirring, and the synthetic butadiene rubber latex and monomer mixtures (A), (B) and (C) shown in Table 1 were added to the reactor in that order. The monomer mixture (A) was polymerized in the presence of the butadiene rubber at 60° C. for 1 hour, and after adding the monomer mixture (B) to the reactor, the polymerization was carried out at 60° C. for 5 hours while gradually adding the monomer mixture (C). Sodium dioctylsulfosuccinate and formaldehyde sodium sulfoxylate were added intermittently during the polymerization. To the obtained polymer latex was added 2,6-di-t-butyl-4-methylphenol to coagulate the polymer. The polymer was washed with water, filtered and dried to give a powder.

The powder was blended with polycarbonate (commercially available under the commercial name "Panlite K-1300W" made by Teijin Limited) in the ratio shown in Table 2 by a blender. The blend was pelletized by an extruder of 40 mm. in diameter. Test specimens were prepared from the pellet by an injection molding machine (injection molding machine FS-150 made by Nissei Kabushiki Kaisha), and the physical properties were measured. The tensile strength was measured according to ASTM D-636, the Izod impact srength was measured according to ASTM D-256 ($\frac{1}{8}$ inch thickness, notched, $-30°$ C.), and the heat distortion temperature was measured according to ASTM D-648 (18.6 kg./cm.$^2$ load).

The results are shown in Table 2.

COMPARATIVE EXAMPLES 1 to 4

The procedures of Examples 1 to 5 were repeated except that the monomer mixtures (A), (B) and (C) shown in Table 1 were added at one time to the reactor and polymerized at 60° C. for 6 hours.

The results are shown in Table 2.

TABLE 1

|  | Ex. 1 | Ex. 2 | Ex. 3 | Ex. 4 | Ex. 5 | Com. Ex. 1 | Com. Ex. 2 | Com. Ex. 3 | Com. Ex. 4 |
|---|---|---|---|---|---|---|---|---|---|
| Diene rubber (solids content) (part) | 18 | 10 | 15 | 20 | 18 | 18 | 18 | 20 | 18 |
| Monomer mixture (A) (part) | | | | | | | | | |
| Acrylonitrile | 3 | 2 | 2.5 | 4 | 3 | 3 | 3 | 15 | 3 |
| Styrene | 6 | 4 | 5 | 8 | 6 | 6 | 6 | 30 | 6 |
| Methyl methacrylate | — | — | 1.5 | — | — | — | — | — | — |
| Cumene hydroperoxide | 0.1 | 0.06 | 0.1 | 0.1 | 0.1 | 0.1 | 0.1 | 0.2 | 0.1 |
| t-Dodecylmercaptan | — | — | — | — | — | — | — | 0.1 | — |
| Monomer mixture (B) (part) | | | | | | | | | |
| α-Methylstyrene | 52 | 62 | 54 | 52 | 52 | 40 | 41 | 25 | 40 |
| Acrylonitrile | — | — | — | 2 | — | — | 10 | — | — |
| Styrene | 4 | — | — | — | 4 | — | — | — | — |
| t-Dodecylmercaptan | 0.2 | 0.2 | 0.2 | 0.2 | 0.2 | 0.2 | 0.2 | — | 0.2 |
| Monomer mixture (C) (part) | | | | | | | | | |
| α-Methylstyrene | — | 2 | — | — | — | — | — | — | — |
| Acrylonitrile | 17 | 20 | 18 | 16 | 17 | 33 | 22 | 10 | 33 |
| Styrene | — | — | — | 1 | — | — | — | — | — |
| Methyl methacrylate | — | — | 4 | — | — | — | — | — | — |
| Cumene hydroperoxide | 0.3 | 0.3 | 0.3 | 0.3 | 0.3 | 0.3 | 0.3 | 0.2 | 0.3 |
| t-Dodecylmercaptan | 0.15 | 0.2 | 0.2 | 0.15 | 0.15 | 0.2 | 0.2 | 0.4 | 0.2 |
| Polymerization conversion (%) | 95 | 94 | 96 | 95 | 95 | 92 | 93 | 94 | 92 |

TABLE 2

|  | Ex. 1 | Ex. 2 | Ex. 3 | Ex. 4 | Ex. 5 | Com. Ex. 1 | Com. Ex. 2 | Com. Ex. 3 | Com. Ex. 4 |
|---|---|---|---|---|---|---|---|---|---|
| Blending ratio (by weight) Resin (I)/Polycarbonate | 60/40 | 60/40 | 60/40 | 60/40 | 80/20 | 60/40 | 60/40 | 60/40 | 80/20 |
| Tensile strength (kg/cm$^2$) | 550 | 660 | 505 | 500 | 510 | 550 | 550 | 500 | 510 |
| Izod impact value (kg.cm/cm) | 30 | 25 | 28 | 32 | 16 | 20 | 21 | 25 | 10 |
| Heat distortion temperature (°C.) | 120 | 122 | 121 | 119 | 117 | 113 | 114 | 109 | 110 |

It is observed in Table 2 that the heat distortion temperature of the composition obtained in the Comparative Examples is lower than that of the compositions obtained in the Examples according to the present invention by at least 7° C.

From the results shown in Table 2, it is understood that the composition of the present invention has an excellent toughness and a high heat distortion resistance.

In addition to the ingredients used in the Examples, other ingredients can be used in the Examples as set forth in the specification to obtain substantially the same results.

What we claim is:

1. A composition comprising (I) a thermoplastic resin and (II) an aromatic polycarbonate in a (I)/(II) ratio of 90/10 to 40/60 by weight, said resin (I) being prepared by polymerizing 95 to 70 parts by weight of monomers in the presence of 5 to 30 parts by weight of diene rubber by a process which comprises polymerizing 2 to 40 parts by weight of (A) a monomer mixture containing at least 70% by weight of acrylonitrile and styrene in an acrylonitrile/styrene ratio of 10/90 to 40/60 by weight in the presence of the diene rubber, adding 50 to 90 parts by weight of (B) α-methylstyrene or a monomer mixture containing at least 80% by weight of α-methylstyrene to the polymerization system, and gradually adding (C) acrylonitrile or a monomer mixture containing at least 70% by weight of acrylonitrile to the system, while carrying out the polymerization, the ratio of the total weight of α-methylstyrene contained in the monomers (B) and (C) to the total weight of acrylonitrile contained in the monomers (B) and (C) being from 90/10 to 65/35.

2. The composition of claim 1, wherein the diene rubber is selected from the group consisting of butadiene rubber, styrene-butadiene rubber, and isoprene rubber.

3. The composition of claim 1, wherein during the period till the polymerization conversion of α-methystyrene reaches 40%, the monomer (C) is added to the polymerization system at a rate such that the ratio of α-methylstyrene to acrylonitrile present in the system is not less than 90/10 by weight.

* * * * *